Patented May 28, 1929.

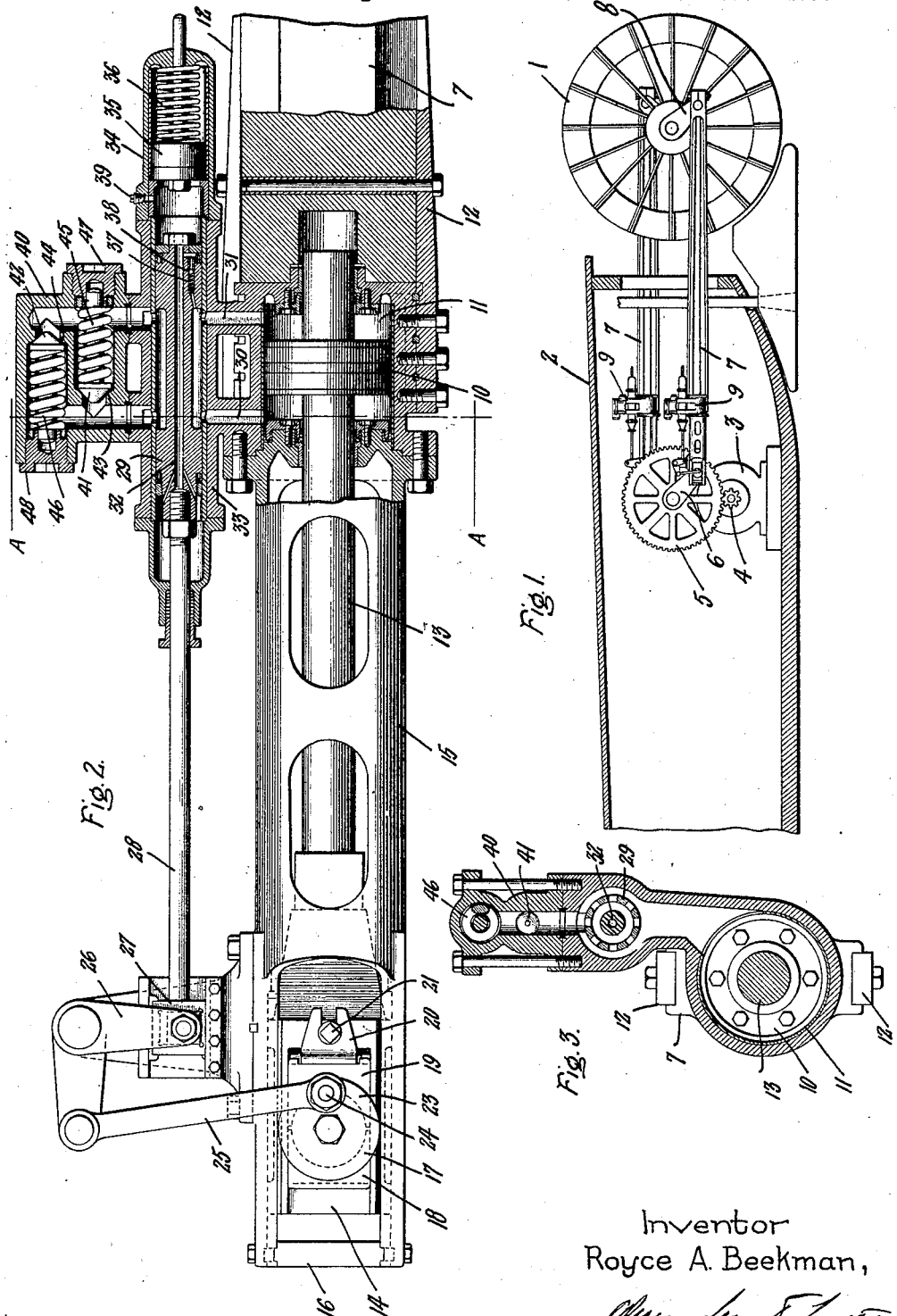

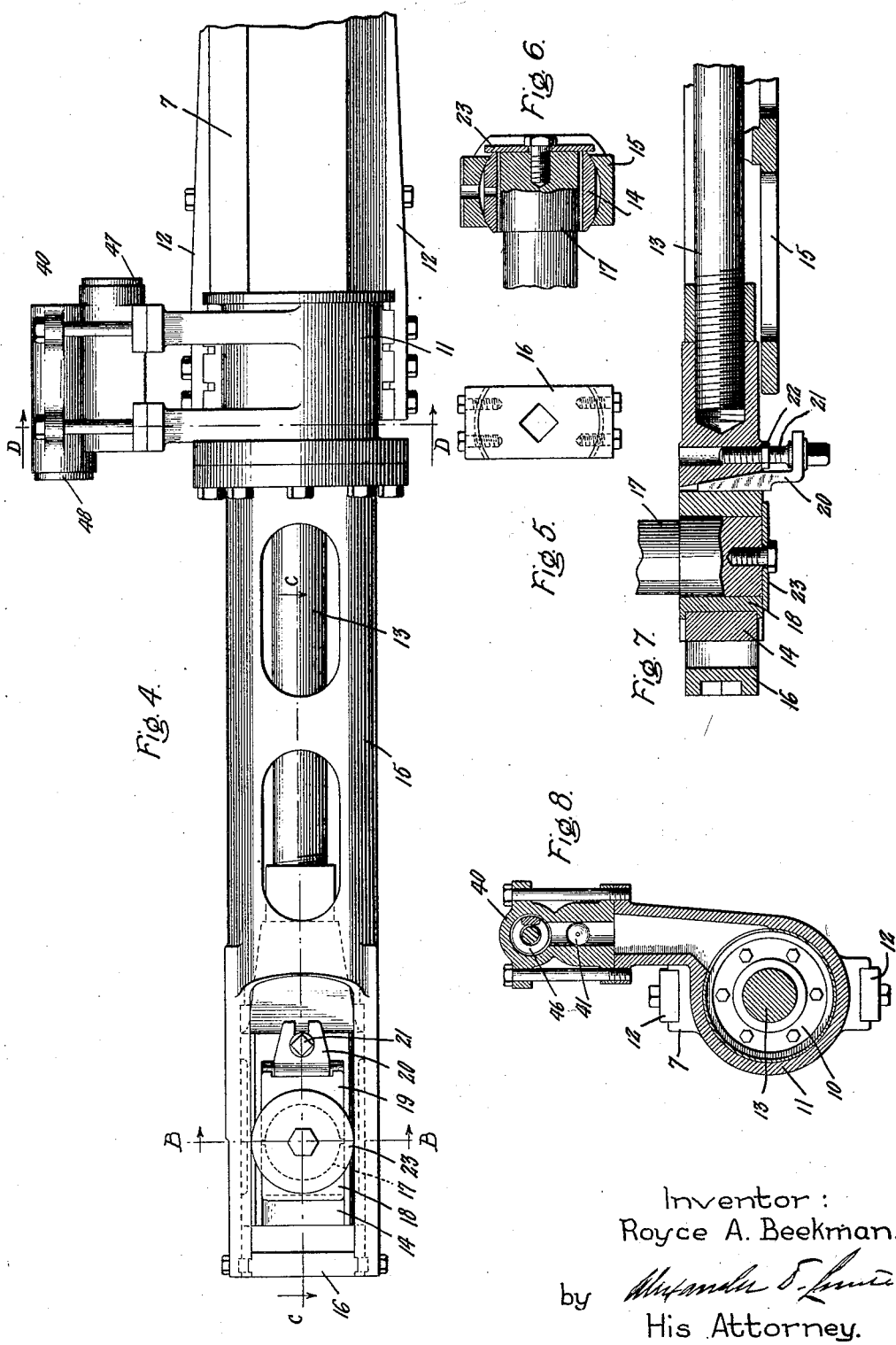

1,714,897

UNITED STATES PATENT OFFICE.

ROYCE A. BEEKMAN, OF SCHENECTADY, NEW YORK, ASSIGNOR TO GENERAL ELECTRIC COMPANY, A CORPORATION OF NEW YORK.

POWER SYSTEM.

Application filed June 8, 1927, Serial No. 197,493. Renewed November 22, 1928.

My invention relates to power systems, and more particularly to electric ship propulsion systems utilizing a mechanical transmission through connecting rods to drive a propeller.

My invention is especially applicable to river boats of the stern wheel type wherein power is transmitted to the paddle wheel through cranks and connecting rods, although in its broader aspects, as will appear hereinafter, my invention is of more general application.

When a continuous torque driving motor such as an electric motor is used in such systems, difficulty is often encountered due to the connecting rods working against each other. To eliminate this objectional feature, it has already been proposed by Charles L. Heisler, whose application, Serial No. 197,492, for "power systems" is filed concurrently herewith, and assigned to the same assignee as the present application, to provide compensated connecting rods that operate automatically to relieve their driving connections whenever they may act to oppose other connecting rods. According to the preferred embodiment of that invention, a connecting rod made up of members arranged to be rigidly or yieldably interconnected through a fluid transmission comprising a piston, a cylinder and regulating means for controlling the flow of fluid from one side of said piston to the other side thereof is used to permit relative movement between the ends of the rod to disable it as a power member or to maintain the pressure of the fluid between the piston and the cylinder and thus enable it to transmit power as if it were a single rigid member.

It is an object of the present invention to provide means for preventing the destruction of connecting rods when for any reason one rod bucks or opposes another rod and thus to secure one of the results that may be accomplished by a compensated rod such as has been proposed. It is a further object of my invention to combine a relief mechanism with the regulating mechanism of a compensated rod such as above described. Further objects and advantages of my invention will become apparent from the following description when considered in connection with the accompanying drawings, and its scope will be pointed out in the appended claims.

In the drawings, Fig. 1 is a side view partly in section of the stern of a paddle wheel boat whose parallel connecting rods are provided with a combined regulating and relief mechanism according to one embodiment of this invention. Fig. 2 is an enlarged view partly in section of the end of a connecting rod shown in Fig. 1 showing the operating parts of the rod, and Fig. 3 is a section of the rod shown in Fig. 2 taken along the lines A—A. Fig. 4 is a side view of the end of a rod provided with relief mechanism according to one embodiment of my invention, and Figs. 6, 7 and 8 are sections of this rod taken along the lines B—B, C—C and D—D. Fig. 5 is an end view of the tie plate of Figs. 2 and 4.

As shown in Fig. 1, the paddle wheel 1 of boat 2 is driven by motors 3 only one of which is shown. The transmission comprises gears 4 and 5, cranks 6, connecting rods 7 and cranks 8 attached to wheel 1. The connecting rods are provided with regulating and relief means shown at 9.

The combined regulating and relief mechanism of a connecting rod is illustrated in detail in Figs. 2 and 3. In Fig. 2 the piston is represented at 10 and the cylinder at 11. The cylinder is bolted to the rod 7 through the agency of straps 12. The piston 10 is connected by a piston rod 13 to a crank-pin box 14. This crank-pin box is supported within member 15 which is bolted to the cylinder 11 and forms a continuation of the rod 7. By thus supporting the crank-pin box, excessive stresses on the cylinder 11 are avoided when the rod as a whole is subjected to bending stresses. The crank-pin box 14 is free to turn within limits about its longitudinal axis which corresponds with the longitudinal axis of the rod by reason of its cylindrical shape and the cylindrical bearing in the end of member 15. This construction is resorted to in order to relieve the rod and crank-pin of strains which would otherwise occur when the boat is subjected to any warping or weaving action. The end of member 15 is closed by a tie plate 16, an end view of which is shown in Fig. 5.

The crank-pin 17 is supported between bearing blocks 18 and 19. An adjustment for taking up wear between the crank-pin and these blocks is provided at 20. As shown best in Fig. 7, this comprises a wedge that may be adjusted by screw 21 and lock nut 22.

Attached to the crank-pin 17 is a plate 23 which has a crank-pin 24 to which is attached a link 25. This link through angle lever 26, crosshead 27 and rod 28 operates a valve 29 that in its movement covers or uncovers ports 30 and 31 of cylinder 11. This valve is a balanced valve that in its movement uncovers one or the other or both of these ports. If either port is covered, a fluid pressure may be built up between the piston 10 and the cylinder 11 and the connecting rod thus rendered rigid and useful for the transmission of power.

The valve 29 is provided with a longitudinal opening 32 that permits fluid to pass from one end of the valve casing 33 to the other side thereof when the valve is moved back and forth in the casing. A reservoir 34 is attached to the end of the valve casing. Fluid may be fed from this reservoir by piston 35 and spring 36 through a passage 37 provided with a check valve 38 into the cylinder 11 by way of ports 30 and 31. The reservoir and connected parts are charged with a fluid, which may be oil, through a passage normally closed by a plug 39.

Attached to the valve casing 33 and in registry with ports 30 and 31 is a valve casing 40. Within this valve casing are bypass valves 41 and 42 spring pressed against seats 43 and 44 by springs 45 and 46. The valves and springs may be removed from this casing by removing plugs 47 and 48. These plugs when in position by exerting pressures on the springs 45 and 46 force the valves against their seats with corresponding pressures. Whenever excessive fluid pressures occur in the cylinder 11 on one side or the other of the piston 10 the fluid within the cylinder may pass from one side of the piston to the other side thereof through the relief valves 41 and 42 when the pressure on the valves is sufficient to overcome the resisting pressure of the springs 45 and 46 which will prevent the connecting rod from breaking by allowing a relative movement between its parts when the force transmitted by the rod attains a predetermined value.

The operation of my improved arrangement is as follows: In Fig. 1, where the rods are parallel and driven by 90 degree cranks, it is desirable to relieve the power connection at the dead center positions to prevent one rod bucking or opposing another. It may also prove desirable in order to relieve crank-pin and connecting rod stresses to transfer the load from a rod working at a mechanical disadvantage at or near its dead center position to a rod working at its best mechanical advantage at or near 90 degrees from its dead center position. This is accomplished through the regulating mechanism above described. With the parts in the position shown in Fig. 2, the rod is free to float. I will assume for purposes of description that this represents the condition at or near its forward dead center position. Then as the crank-pin rotates in a counter-clockwise direction, the valve will be moved through the linkage comprising members 23, 24, 25, 26, 27 and 28 toward the left until port 31 is covered by valve 29. Fluid pressure will then be built up between the piston 10 and cylinder 11 and the rod will be capable of transmitting a thrusting force to the driven crank 8. This situation will continue until the crank 6 approaches after dead center by which time the valve 29 will have again approached the position illustrated. The rod will then float by this dead center position since both ports 30 and 31 are uncovered. After leaving this after dead center position, the valve will be moved to the right and port 30 will be covered when pressure will be built up between the piston 10 and cylinder 11 and the rod enabled to transmit a pulling force on the crank 8.

The crank angles at which valve 29 covers and uncovers ports 30 and 31 will be determined by the proportions of the valve and the arrangement and nature of the linkage used to operate it. For example, the crank angle at which a port is covered may be changed by providing an adjustment in angle lever 26 so that the relative length of its arms may be changed or a new angle lever may be substituted. Other arrangements will occur to those skilled in the art.

If for any reason the force transmitted by a rod while the regulator is functioning reaches destructive proportions, the fluid pressure maintained between the piston and the cylinder of the regulating valve 29 will be relieved by the bypass valves 41 and 42. This same action will take place if the regulating mechanism becomes damaged or fails to operate properly. In fact my relief mechanism may be used in place of a regulator under certain conditions where it is not necessary to relieve the driving connection through the rod during predetermined periods of its operating cycle while at the same time it is necessary to protect the rods against breakage due to one rod opposing another. A connecting rod designed for such service is shown in Figs. 4 to 7. The general similarity of the parts of this connecting rod to the connecting rod shown in Fig. 2 is apparent, the only difference being that the regulating mechanism comprising valve 29 and its operating parts have been omitted and the valve casing 40 bolted directly to the cylinder 11 in registry with ports 30 and 31. In view of this, it is thought unnecessary to again describe the arrangement of parts in detail since the arrangement is apparent from the reference numerals which correspond to those used in the previous description of the connecting rod of Fig. 2.

It is apparent that, while I have explained my invention by illustrating and describing certain specific embodiments thereof, other arrangements may be employed without departing from the spirit and scope of my invention. The terms of the appended claims, are, therefore, intended to cover all changes and modifications within the true spirit and scope of my invention.

What I claim as new and desire to secure by Letters Patent of the United States, is:—

1. In combination with a crank and a connecting rod, means allowing relative movement between the ends of said rod for disabling said rod as a power transmitting member when the crank is passing through a predetermined angle of movement and means for allowing relative movement between the ends of said rod at any time when the force transmitted by said rod exceeds a predetermined value.

2. In combination with a crank and a connecting rod, fluid transmission means in said rod comprising a piston and a cylinder, ports communicating with the cylinder on opposite sides of said piston, a valve for controlling the flow of fluid from said cylinder through said ports, means connected to said valve responsive to crank position for controlling the flow of fluid from one side of said piston to the other side thereof, and a plurality of relief valves connected with said ports and independent of said controlling valve for passing fluid from one side of said piston to the other side thereof when the force transmitted by said rod is greater than a predetermined amount.

3. In combination with a connecting rod comprising members arranged normally to be rigidly or yieldingly interconnected by regulating means responsive to the operation of said rod, means permitting a yielding interconnection of said members independent of said regulating means when the force exerted by said rod exceeds a predetermined value.

4. In a power system, a plurality of motors, a plurality of cranks set at an angle relative to each other driven by said motors, a plurality of interconnected driven cranks, connecting rods extending between said driving cranks and said driven cranks, and fluid transmission means in each of said rods comprising a cylinder and a piston, said cylinder being provided with ports at opposite ends thereof and relief valves connected with said ports for passing fluid from one side of said piston to the other side thereof when the force transmitted by a rod is greater than a predetermined amount.

5. In a power system, a plurality of motors, a plurality of cranks set at 90° relative to each other driven by said motors, a plurality of interconnected driven cranks, connecting rods extending between said driving cranks and said driven cranks, and fluid transmission means in each of said rods comprising a cylinder and a piston, said cylinder being provided with ports at opposite ends thereof and relief valves connected with said ports for passing fluid from one side of said piston to the other side thereof when the force transmitted by a rod is greater than a predetermined amount.

6. In a boat of the stern wheel type, continuous torque driving means, means comprising connecting rods for driving said stern wheel from said driving means, means in said rods for disabling them as power transmitting members during predetermined portions of their operating cycles, and means in said rods for limiting the force exerted by said rods.

7. In a ship propulsion system, a plurality of driving cranks, a plurality of interconnected driven cranks, connecting rods extending between said driving cranks and said driven cranks, means in each connecting rod responsive to the angular position of one of its connected cranks for transferring the load from one of said driving cranks to another of said driving cranks at predetermined angular positions of said cranks, and means in said rods for limiting the forces transmitted by said rods.

8. In a ship propulsion system, an electric motor, a paddle wheel, transmission means between said motor and said paddle wheel comprising a connecting rod, means in said rod for disabling it as a power transmitting member during a predetermined portion of its operating cycle, and means in said rod for limiting the force exerted by said rod.

In witness whereof, I have hereunto set my hand this 4th day of June, 1927.

ROYCE A. BEEKMAN.